ns cited.

United States Patent
Alperovich et al.

[15] 3,673,866
[45] July 4, 1972

[54] PITOT TUBE PROBE FOR TAKING TOTAL HEAD AND STATIC PRESSURE OF AIR FLOW

[72] Inventors: Viktor Borisovich Alperovich, Astakhousky pereulok 1/2, kv. 112; Alfred Iosifovich Prut, ulitsa Medvedeva, 14, kv. 32, both of Moscow, U.S.S.R.

[22] Filed: Dec. 31, 1970

[21] Appl. No.: 103,133

[30] Foreign Application Priority Data

Jan. 15, 1970 U.S.S.R..............................1,395,303

[52] U.S. Cl....................................73/212, 73/182, 73/388
[51] Int. Cl........................................................G01p 5/16
[58] Field of Search ............................73/182, 183, 212, 389

[56] References Cited

UNITED STATES PATENTS

| 1,240,790 | 9/1917 | Bristol | 73/182 |
| 3,228,247 | 1/1966 | Hansen et al. | 73/389 |
| 3,400,583 | 9/1968 | Newport et al. | 73/182 |

*Primary Examiner*—Richard C. Queisser
*Assistant Examiner*—John P. Beauchamp
*Attorney*—Holman & Stern

[57] ABSTRACT

A pitot tube for taking a total head and a static pressure of an air flow. This probe comprises a tip having a streamlined nose surface which is provided with an opening for taking a total head, which surface smoothly transforms into a cylindrical surface provided with an opening for taking a static pressure. The above-said cylindrical surface is equipped with a ring for aerodynamic compensation of the errors appearing during the measurement of the static pressure.

1 Claim, 5 Drawing Figures

PATENTED JUL 4 1972 3,673,866

PITOT TUBE PROBE FOR TAKING TOTAL HEAD AND STATIC PRESSURE OF AIR FLOW

The present invention relates to instruments for measuring parameters of an air flow and, more particularly, the invention relates to pitot tube probes for taking a total head and a static pressure.

The most expedient is to employ the pitot tube probe accomplished according to the present invention in aircrafts.

Widely known in the art are pitot-static probes for taking a total head and a static pressure. The main working member of such receivers is a tip with a streamlined nose surface which transforms into a cylindrical surface. Located in the nose portion of the tip and adequately spaced therefrom are openings for taking a static pressure. The total and static pressures taken by the probe are transferred to consumers including a flight speedometer, altimeter, etc., through pipelines.

When employing the known pitot tube probes in aircrafts, the measurements of the static pressure suffer from the errors appearing due to the interaction between the aircraft and the contrary air flow, i.e. within the zone of the probe the static pressure is not equal to the static pressure of the nonturbulent air flow.

An object of the present invention is to eliminate the above-mentioned disadvantage.

The main object of the invention is to provide such a pitot tube probe for taking a total head and a static pressure of the air flow which would compensate for the errors appearing due to the effect of the aircraft on the results of the measurements of the static pressure.

This object is accomplished owing to the fact that the pitot tube probe for taking a total head and a static pressure of an air flow comprising a tip in which the streamlined nose surface has an opening for taking a total head and transforms into a cylindrical surface with an opening for taking a static pressure, according to the invention, has a ring arranged on the external cylindrical surface of the tip and producing a vacuum zone there behind and a high-pressure zone in front thereof, which ring is located in such a way with respect to the openings for taking the static pressure that it compensates for the error in the measurements of the static pressure while taking into consideration the sign of this error.

The air pressure receiver made according to the present invention allows one to reduce the error in measurements of the static pressure to a permissible minimum or, practically, to zero.

The invention will be clearly understood from the following detailed description of one particular embodiment of the invention, reference being made to the accompanying drawings, in which.

Figure 1:
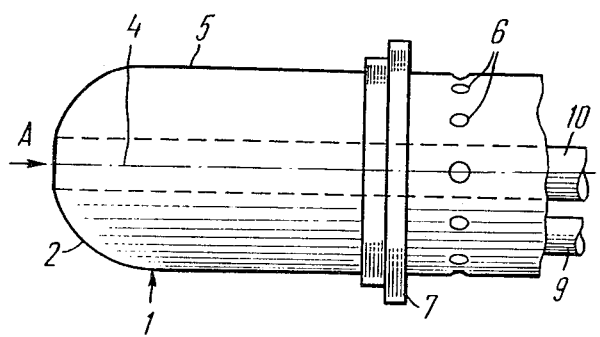
FIG. 1 is the pitot tube probe according to the present invention, wherein a ring is mounted in front of the openings for taking a static pressure.
Figure 2:
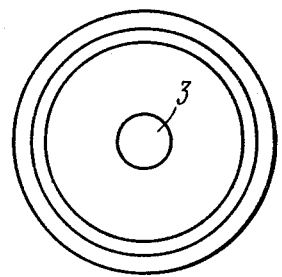
FIG. 2 is a view taken along the arrow A in FIG. 1.

The pitot tube probe for taking a total head and a static pressure of an air flow has a tip 1 (FIGS. 1, 2). The streamlined nose surface 2 of the tip has an opening 3 for taking a total head, which opening is located symmetrically with respect to the geometrical axis 4 of the tip. The streamlines nose surface 2 smoothly transforms into a cylindrical surface 5. Located on this cylindrical surface are openings 6 for taking a static pressure. Mounted on the cylindrical surface 5 in front of the openings 6 and symmetrically to the axis 4 is a ring 7. Such arrangement of the ring provides for a vacuum within the zone of disposition of the openings 6 and, therefore, reduces the value of the static pressure measured by the probe. Thus, the mounting of the ring in front of the static pressure openings makes it possible to compensate for the errors in the measurements of the static pressure, if the pitot tube probe is located within the zone where the static pressure exceeds the static pressure of the nonturbulent flow.

Figure 3:
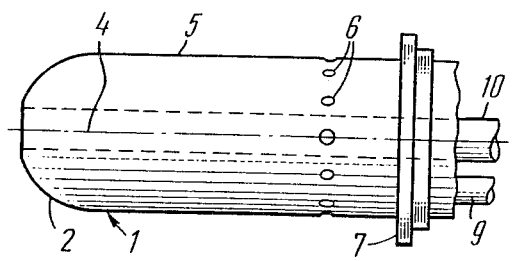
FIG. 3 is the same device as that shown in FIG. 1 equipped with a ring mounted behind the openings for taking a static pressure.
Figure 4:
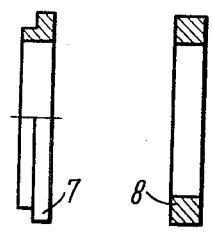
FIG. 4 is a ring having a shaped section.
Figure 5:
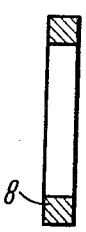
FIG. 5 is a ring having a rectangular section.

If the pitot tube probe is located within the zone where the static pressure is lower than the static pressure of the nonturbulent flow, the ring 7 is mounted behind the openings 6 as shown in FIG. 3. In this case there is also compensated an error in the measurements of the static pressure as in this case the ring 7 creates a high-pressure zone before itself.

The dimensions of the ring 7, its section and the place of installation on the tip 1 are selected experimentally depending on the value and sign of the error introduced by the aircraft into the measurement of the air flow.

The pitot tube probe through unions 9 and 10 and pipelines (not shown) is communicated with respective instruments to which it is necessary to apply a total head and a static pressure either simultaneously or separately. For example, the altimeter is connected to the union 9, which through a hermetically sealed space (not shown) communicates with the openings 6 for taking a static pressure, while the speedometer is connected both to the union 9 and to the union 10 coupled with the opening 3 for taking a total head.

The pitot tube probe for measuring a total head and a static pressure of an air flow, accomplished according to the present invention, operates in the same manner as widely known pitot-static heads presently used.

The flight tests of helicopters equipped with experimental specimens of the pitot tube probes made according to the present invention have shown that by mounting the rings on the tip it is possible to compensate for the errors appearing due to the action of the aircraft on the contrary air flow, thus obtaining a relatively high accuracy of measurement of the static pressure.

We claim:

1. A pitot tube probe for taking a total head and a static pressure of an air flow comprising in combination: a tip having a streamlined nose surface with an opening for taking a total head, smoothly transforming into a cylindrical surface having an opening for taking a static pressure, a ring producing a vacuum zone there behind and a high-pressure zone in front thereof, said ring being mounted on said cylindrical surface and located relative to said openings so as to compensate for an error in the measurement of the static pressure, the sign of the error being taken into account.

* * * * *